Patented Dec. 4, 1928.

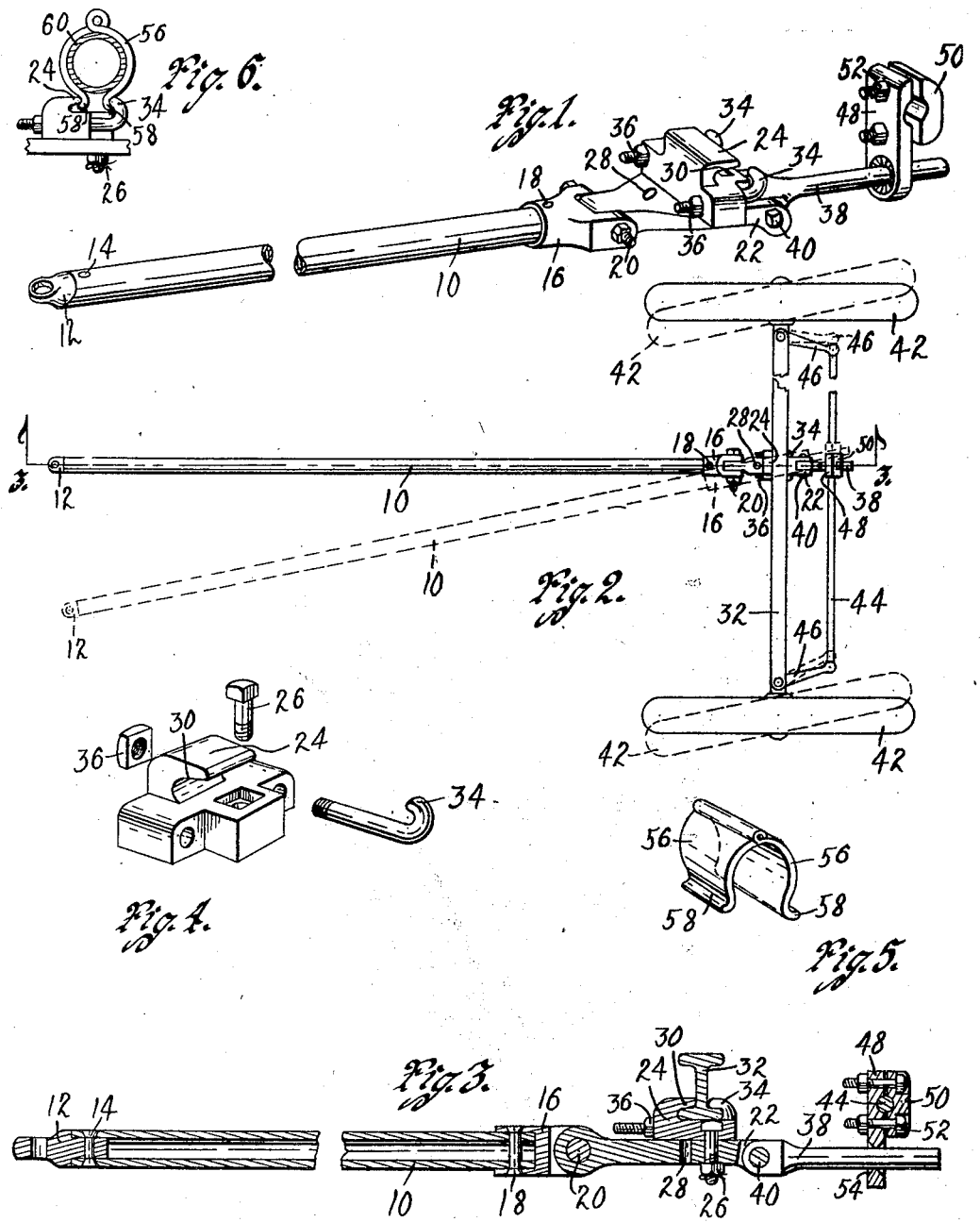

1,694,278

UNITED STATES PATENT OFFICE.

ALGOT W. NORDGREN, OF ST. PAUL, MINNESOTA, ASSIGNOR TO MARQUETTE MANUFACTURING COMPANY.

COUPLING AND STEERING DEVICE FOR AUTOMOBILES.

Application filed September 30, 1926. Serial No. 138,637.

The object of my invention is to provide a coupling and steering device for automobiles wherein a trailed or towed automobile may be connected to the rear of another automobile in such manner as will cause the trailed vehicle to be steered properly and follow the front automobile without the necessity of having a driver for the towed automobile, the parts of the device being simple, durable and readily adapted for use upon various makes and styles of automobiles.

More particularly it is my invention to provide a device wherein axles and steering rods of automobiles in tow may be quickly and easily connected to my tow pole regardless of the different sizes and shapes of the axles and steering rods, as well as taking care of axles and tie rods that are different distances apart or different heights relative to ground level.

Still a further object is to provide a fitting adapted to take care of tubular axles and having parts thereon so that the tow pole may be connected thereto the same as it may be connected to an ordinary I-beam axle.

With these and other objects in view, my invention consists in the construction, arrangement and combination of the various parts of my coupling and steering device for automobiles, whereby the objects contemplated are attained, as hereinafter more fully set forth pointed out in my claim, and illustrated in the accompanying drawings, in which:

Figure 1 is a perspective view of my improved tow pole.

Figure 2 is a top plan view of the same installed upon the front axle and steering rod of an automobile.

Figure 3 is a sectional view through the tow pole illustrating the connections with the axle and steering rod.

Figure 4, is a perspective view of the axle engaging unit.

Figure 5 is a perspective view of a fitting for tubular axles and

Figure 6 illustrates the connection of the tow pole with a tubular axle.

In the accompanying drawings I have used the reference numeral 10 to indicate generally a tube of considerable length having at its forward end an eye fitting 12 adapted to have a contracted portion received in the front end of the tube and secured thereto by a rivet or the like 14.

The eye fitting 12 is adapted to coact with an ordinary hook of any suitable kind that may be fixed at any convenient place upon the rear end of the automobile commonly known as a "wrecker" that does the towing work.

Secured to the rear end of the tube or pipe 10 is a clevis fitting 16 having a socket into which the tube 10 extends and is secured thereto by a rivet or the like 18.

An axle clamp unit A is connected to the clevis fitting 16 by the bolt 20 for allowing pivotal movement of the entire unit A. The unit A includes a plate or support 22 upon which is mounted a C-shaped clamp member 24.

The member 24 is formed with an opening through which is extended a bolt 26. The bolt 26 may be received in either of the openings 28 formed in the plate or support 22.

The entire clamp member 24 is capable of pivotal movement upon a vertical axis. The bolt 26 serves as the axis for the clamp member 24.

The C-shaped clamp member 24 has a fixed portion or over-hanging flange 30 adapted to extend over the lower flange of an I-beam axle 32.

Adjustably mounted within the axle member 24 are the hook bolts 34. The hook bolts 34 are designed to engage the lower flange of the I-beam axle 32 on the opposite side from the flange 30 so that when the nuts 36 upon the hook bolts 34 are tightened the axle 32 will be securely held to the C-shaped axle clamp member 24.

Axles of different sizes may be engaged by the member 24 due to the adjustability of the hook bolts 34. It will be noted that the entire axle unit A may be pivotally moved relatively to the tow pole or tube 10 upon the pivot bolt 20. Such pivotal movement being had only on a horizontal axis.

Pivotally connected to the rear end of the plate 22 is a continuation of a tow pole in the form of a short rod 38. The rod 38 is pivotally mounted upon the bolt 40 which in turn is journalled in the plate 22 as clearly illustrated in Figures 1 and 3 of the drawings.

The rod 38 is therefore capable of movement relative to the entire axle unit A, upon a horizontal axis.

Mounted upon the axle 32 are the steerable front wheels 42 which are connected together by a steering rod 44 positioned rearwardly of the axle 32. The steering rod is connected to the steerable wheels 42 through the short arms 46.

Longitudinal movement of the steering rod 44 will impart steering movement to the front wheels of the automobile as indicated in the dotted lines in Figure 2 of the drawings.

In order to properly steer the towed vehicle without the service of a driver, it is necessary to have a proper connection between the axle 32 and the steering rod 44 made by use of my tow pole and this particularly includes the rod 38.

Upon the steering rod 44 I mount a clamp unit B which includes a pair of separate plates 48 and 50 connected together by bolts or the like 52. The plates 48 and 50 upon their adjacent surfaces are each formed with a groove adapted to receive the steering rod 44.

When the bolts 52 are tightened the two plates 48 and 50 rigidly engage the steering rod 44. The plate 48 is considerably longer than the plate 50 and is formed with an opening 54 which has its inner walls counter-sunk in opposite directions.

The rod 38 extends through the opening 54 and due to the counter-sunk walls of the opening, the rod is capable of a certain amount of pivotal or rather universal movement relative to the clamp unit B.

Movement of the tow pole or tube 10 in the direction indicated by the dotted lines in Figure 2 of the drawings, will cause the entire structure with the exception of the axle clamp 24 to pivot relative to the front axle 32 upon the bolt 26 as a pivot point.

Such movement will cause the rod 38 to move the steering rod 44 in the same direction as does the tow pole proper or tube 10. It therefore follows, that the vehicle in tow will be properly steered and will follow the so-called "wrecker."

The arrangement of the pivot bolts 20 and 40 is such as to allow for up and down pivotal movement of the parts relative to each other but will not allow any sidewise movement so that when the tow pole or tube 10 is moved sidewise, all of the parts that is, the plate 22 and rod 38, will move as though they were rigid continuations of the tube 10.

Due to the pivotal connection 40 of the rod 38 with the plate 22, I am able to have my device mounted upon automobiles where the steering rods are either higher or lower than the axle proper.

It will be noted that the C-shaped clamp member 24 is particularly adapted for use in connection with I-beam axles.

In Figures 5 and 6 of the drawings I have illustrated a tubular axle fitting or adaptor 56. The adaptor 56 includes a pair of semi-cylindrical members hingedly connected together and having their two free edges formed with outturned hooks 58.

The adaptor 56 is designed to be mounted upon a tubular axle 60 and the overhanging flange 30 of the member 24 engages one of the hooks 58 while the hook bolts 34 engage the other hook member 58 of the adaptor 56.

Some changes may be made in the construction and arrangement of the parts of my device without departing from the real spirit and purpose of my invention and it is my intention to cover by my claim, any modified forms of structure or use of mechanical equivalents, which may be reasonably included within their scope.

I claim as my invention:

In combination with the axle of an automobile having steerable wheels thereon and a steering rod connecting the wheels whereby longitudinal movement of the steering rod imparts steering movement to the steerable wheels, a tow pole comprising an axle clamp, said clamp having means for engaging two sides of the axle, an adapter comprising a hinged band having hooked ends adapted to be engaged by said last mentioned means, a connecting member pivoted thereto for swinging movement in a horizontal plane, a rod pivoted to said connecting member for swinging movement in a vertical plane to provide for steering rods of different heights relative to the axle, a steering rod clamp having an opening therein tapered from each end thereof for slidably and loosely receiving said rod to provide for steering rods of different distances from the axle and to allow lateral swinging movement of said rod relative to the steering rod clamp, and a draw bar connected to said connecting member and having fastening means at its forward end.

Des Moines, Iowa, September 15, 1926.

ALGOT W. NORDGREN.